(12) United States Patent
Nishinaga et al.

(10) Patent No.: US 12,113,463 B2
(45) Date of Patent: Oct. 8, 2024

(54) MOTOR CONTROL DEVICE

(71) Applicant: FANUC CORPORATION, Minamitsuru-gun (JP)

(72) Inventors: Naoya Nishinaga, Yamanashi-ken (JP); Kenta Yamamoto, Yamanashi-ken (JP)

(73) Assignee: FANUC CORPORATION, Yamanashi-ken (JP)

( * ) Notice: Subject to any disclaimer, the term of this patent is extended or adjusted under 35 U.S.C. 154(b) by 170 days.

(21) Appl. No.: 17/925,938

(22) PCT Filed: May 14, 2021

(86) PCT No.: PCT/JP2021/018317
§ 371 (c)(1),
(2) Date: Nov. 17, 2022

(87) PCT Pub. No.: WO2021/235328
PCT Pub. Date: Nov. 25, 2021

(65) Prior Publication Data
US 2023/0188073 A1     Jun. 15, 2023

(30) Foreign Application Priority Data

May 20, 2020    (JP) .................. 2020-087801

(51) Int. Cl.
| | |
|---|---|
| *H02P 23/24* | (2016.01) |
| *H02P 23/14* | (2006.01) |
| *H02P 27/08* | (2006.01) |
| *H02P 29/028* | (2016.01) |

(52) U.S. Cl.
CPC .............. *H02P 23/24* (2016.02); *H02P 23/14* (2013.01); *H02P 27/085* (2013.01); *H02P 29/028* (2013.01)

(58) Field of Classification Search
CPC ........ H02P 23/24; H02P 23/14; H02P 27/085; H02P 29/028; H02P 6/30; H02P 6/22
USPC ............................................ 318/400.01, 700
See application file for complete search history.

(56) References Cited

U.S. PATENT DOCUMENTS 7,450,355 B2 * 11/2008 Ochiai ................. H02H 3/05
                                                        318/434

FOREIGN PATENT DOCUMENTS

| JP | H 09-016233 A | 1/1997 |
|---|---|---|
| JP | 2003-088154 A | 3/2003 |
| JP | 2009-165267 A | 7/2009 |
| JP | 2013-113695 A | 6/2013 |
| JP | 2014-090611 A | 5/2014 |

OTHER PUBLICATIONS

International Search Report (ISR) (PCT Form PCT/ISA/210), in PCT/JP2021/018317, dated Jul. 13, 2021.

* cited by examiner

*Primary Examiner* — David Luo
(74) *Attorney, Agent, or Firm* — Sughrue Mion, PLLC

(57) ABSTRACT

When the rotation direction of a motor is determined by a connection determination unit not to match a rotation command, the phase sequence of a current detection signal and the phase sequence of a voltage command are changed by a phase sequence change unit, or the positive/reverse polarity of an encoding signal outputted from an encoder is inverted by the phase sequence change unit, whereby the rotation direction of the motor controlled by a motor control device can match the rotation command.

4 Claims, 7 Drawing Sheets

FIG. 2

46: DETERMINATION TABLE

| ITEM　　　PATTERN | I | II | III | IV |
|---|---|---|---|---|
| ROTATION DIRECTION OF MOTOR BASED ON ROTATION COMMAND (Cr, Ci) | NORMAL | NORMAL | REVERSE | REVERSE |
| ROTATION DIRECTION OF ENCODER DETECTED BY ENCODED SIGNAL (Dab) | NORMAL | REVERSE | NORMAL | REVERSE |
| MATCH/MISMATCH DETERMINATION SIGNAL (Dt) | MATCH | MISMATCH | MISMATCH | MATCH |

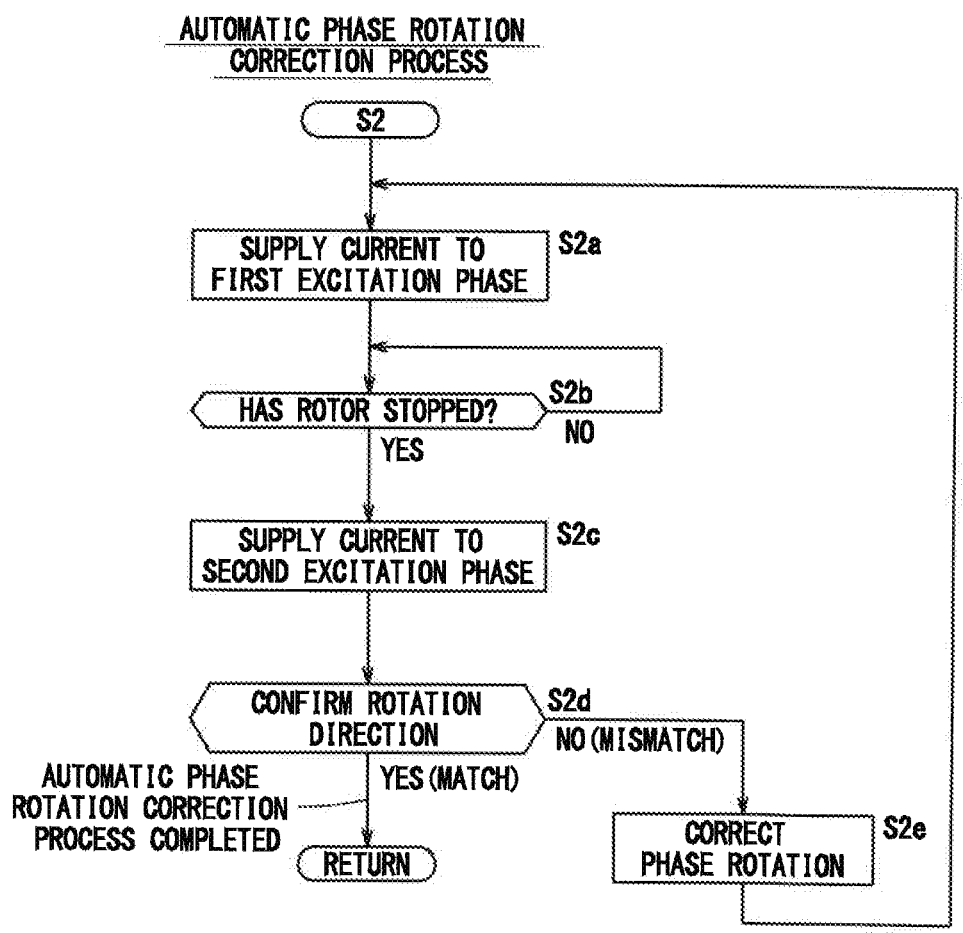

SUPPLY CURRENT TO EXCITATION PHASE OF 270° ROTOR MOVES

ROTOR STOPS

SUPPLY CURRENT TO EXCITATION PHASE OF 0° ROTOR ROTATES IN EITHER DIRECTION

ROTATION DIRECTIONS MATCH EACH OTHER CONNECTION OF MOTOR POWER LINES OR ATTACHMENT OF ENCODER IS CORRECT

ROTATION DIRECTIONS MISMATCH EACH OTHER CONNECTION OF MOTOR POWER LINES OR ATTACHMENT OF ENCODER IS WRONG

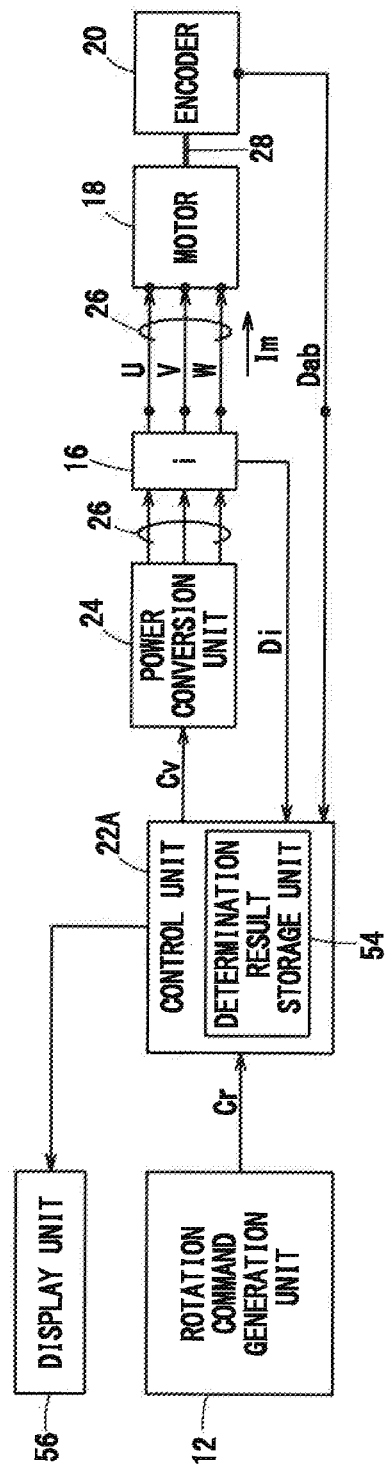

MOTOR CONTROL DEVICE

TECHNICAL FIELD

The present invention relates to a motor control device in which three phase currents supplied from the motor control device to a stator coil of a motor through power lines are fed back to the motor control device, and a rotation state of the motor (rotor) is fed back to the motor control device through an encoder.

BACKGROUND ART

For example, a servo control system is disclosed in JP H09-016233 A. In this servo control system, current sensors detect currents flowing through at least two of a U phase, a V phase, and a W phase of output terminals of a servo motor at the time of the first acceleration after the servo control system is powered on, and patterns of the detected current waveforms are monitored to determine the presence or absence of misconnection of the output terminal (claim 1 of JP H09-016233 A).

JP H09-016233 A also discloses that, when the misconnection of the output terminal is determined, operation may be continued by automatically switching a voltage command output phase by means of software (paragraph [0094] of Written Amendment of JP H09-016233 A).

JP 2009-165267 A discloses a motor control device that determines correct connection (normal connection) in which the phase rotation of U, V, and W phases of the windings of a motor is correct, or reverse connection, by comparing a rotation direction based on an electrical angle command with a rotation direction detected by an encoder (paragraph [0029] of JP 2009-165267 A).

SUMMARY OF THE INVENTION

According to the technology disclosed in JP H09-016233 A, patterns of the current waveforms are monitored to determine the presence or absence of misconnection of the output terminal, and operation can be continued by automatically switching the voltage command output phase by means of software. However, there is a problem that monitoring the patterns of the current waveforms is complicated.

Further, the technology disclosed in JP 2009-165267 A is predicated on the correctness of the rotation direction (physical connection) of the encoder, and there is no description about processing in a case where the rotation direction of the encoder is physically reversed, in other words, in a case where the attachment direction of the encoder is wrong.

The present invention has been made in consideration of such a problem, and an object thereof is to provide a motor control device with which, even if the phase rotation of three-phase power lines connected to a motor or the attachment direction (normal or reverse polarity) of an encoder is physically wrong, it can be easily detected, and a rotation direction detected by the encoder can be matched with a rotation command without changing physical connection of the power lines and physical connection of the encoder.

According to an aspect of the present invention, provided is a motor control device, including: a control unit configured to control a motor on a basis of voltage commands that are based on a rotation command; a rotation direction detection unit configured to detect a normal or reverse polarity of a rotation direction of the motor; and a current detection unit configured to detect a current flowing through each of power lines of the motor, wherein the control unit includes a connection determination unit for the power lines, and a phase rotation change unit, the connection determination unit for the power lines determines whether the rotation direction of the motor that is based on the rotation command and the rotation direction detected by the rotation direction detection unit match or mismatch each other, and when the rotation directions are determined to mismatch each other by the connection determination unit, the phase rotation change unit changes a phase rotation of detected current values and a phase rotation of the voltage commands, or reverses a polarity detected by the rotation direction detection unit, thereby controlling the motor.

According to the present invention, even if the phase rotation of the power lines physically connected between the power conversion unit and the motor or the attachment direction of the rotation direction detection unit is wrong, the phase rotation change unit changes the phase rotation of the detected current values detected by the current detection unit and the phase rotation of the three-phase voltage commands, or reverses the polarity detected by the rotation direction detection unit to control the motor, whereby the rotation direction of the motor can be matched with the rotation direction based on the rotation command, without changing the physical connection of the power lines.

BRIEF DESCRIPTION OF DRAWINGS

FIG. 2 is a diagram showing a determination table referred to in a determination process of a connection determination unit;

FIG. 4 is a flowchart provided for explaining in detail an automatic phase rotation correction process in the main flowchart of FIG. 3;

FIG. 7 is a schematic configuration diagram of a motor control device according to a modification.

DESCRIPTION OF THE INVENTION

A preferred embodiment of a motor control device according to the present invention will be described in detail hereinbelow with reference to the accompanying drawings.

Configuration

Figure 1:
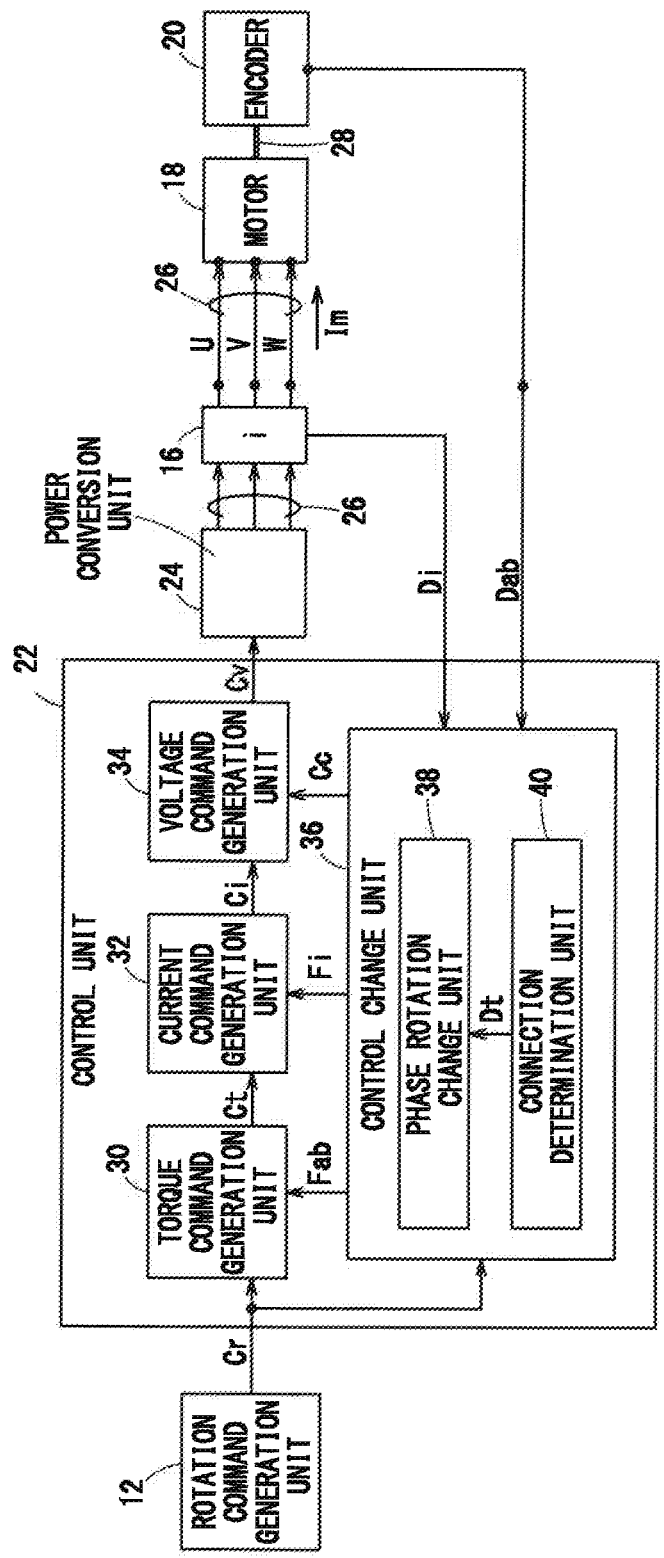
FIG. 1 is a schematic configuration diagram of a motor control device according to an embodiment.

FIG. 1 is a schematic configuration diagram of a motor control device 10 according to an embodiment.

The motor control device 10 that controls a motor 18 includes a rotation command generation unit 12, a control unit 22, a power conversion unit 24, current sensors 16 serving as current detection units, and an encoder 20 serving as a rotation direction detection unit.

The control unit 22 receives a rotation command (rotation command signal) Cr from the rotation command generation unit 12, and sends three-phase (U phase, V phase, and W phase) AC voltage commands (voltage command signals)

Cv to a PWM signal generation unit (not shown) that configures the power conversion unit 24.

One ends of power lines 26 of three phases of U phase, V phase, and W phase are connected to an output side of the power conversion unit 24, and the other ends of the three-phase power lines 26 are connected from output terminals (illustrated by dots) to U phase, V phase, and W phase input terminals (illustrated by dots) of the motor 18 through the current sensors 16.

Three-phase AC currents of U phase, V phase, and W phase obtained by converting DC power (not shown) into three-phase AC power by the power conversion unit 24 based on the three-phase voltage commands Cv flow through the three-phase power lines 26. The DC power applied to the power conversion unit 24 is, for example, DC voltage power obtained by rectifying the three-phase AC voltage by a converter and a capacitor.

The three-phase power lines 26 connected to the motor 18 are provided with the current sensors 16 that detect currents (motor currents) Im of three phases of U phase, V phase, and W phase flowing through the respective power lines 26, and sends current detection signals (detected current values) Di of the three phases to the control unit 22.

The motor 18 is a synchronous motor. The motor 18 includes a stator (stator coil) including windings of three phases of U phase, V phase, and W phase, and a rotor including a permanent magnet. The rotor rotates in synchronization with a rotating magnetic field formed by the three-phase motor currents Im supplied to the stator coil.

The encoder 20 of incremental type is pivotally supported on a rotary shaft 28 of the motor 18. The encoder 20 outputs a Z-phase signal which is an origin signal, and an A-phase signal and a B-phase signal having a phase difference of 90°, and sends these signals as encoded signals Dab (including the Z-phase signal) through the output terminal thereof (illustrated by a dot) to the control unit 22 via the input terminal (illustrated by a dot). Note that the encoder 20 is not limited to an incremental encoder, and may be an absolute encoder.

The control unit 22 is constituted by a microcomputer, and functions as a torque command generation unit 30, a current command generation unit 32, a voltage command generation unit 34, and a control change unit 36 when the CPU executes processing.

The control change unit 36 is constituted by a phase rotation change unit 38 and a connection determination unit 40.

The torque command generation unit 30 generates a torque command (torque command signal) Ct based on a difference between the rotation command Cr received from the rotation command generation unit 12 and A-phase and B-phase feedback signals Fab generated by the control change unit 36 of the control unit 22 based on the encoded signal Dab, and sends the torque command Ct to the current command generation unit 32.

The current command generation unit 32 generates (calculates) a current command (current command signal) Ci based on a difference between the torque command Ct sent from the torque command generation unit 30 and current feedback signals Fi generated by the control change unit 36 of the control unit 22 based on the current detection signals Di, and outputs the current command Ci to the voltage command generation unit 34.

The voltage command generation unit 34 generates voltage commands Cv of three phases of U, V, and W based on the current command Ci and a phase rotation change command (phase rotation change command signal) Cc, and sends the voltage commands Cv to the power conversion unit 24.

In the control change unit 36, the connection determination unit 40 determines whether the connection of the three-phase power lines 26 is correct or incorrect (revere connection) and whether the attachment direction of the encoder 20 is correct or incorrect by confirming (determining) whether the rotation direction of the motor 18 indicated by the rotation command Cr (referred to as a commanded rotation direction) matches or mismatches the rotation direction of the motor 18 indicated by the encoded signals Dab detected by the encoder 20 (referred to as a detected rotation direction), and outputs a match/mismatch determination signal (match/mismatch determination result signal) Dt to the phase rotation change unit 38.

FIG. 2 shows a determination table 46 that is referred to in the determination process of the connection determination unit 40. The determination table 46 is stored in advance in a storage unit of the control unit 22.

As can be seen from the determination table 46, the match/mismatch determination signal Dt indicating "Dt=match" is output from the connection determination unit 40 when the rotation direction (commanded rotation direction) of the motor 18 based on the rotation command Cr is a normal direction and the rotation direction (detected rotation direction) of the encoder 20 as detected by the encoded signals Dab of the encoder 20 and determined by the connection determination unit 40 is a normal direction (normal polarity) (pattern I), and when the rotation direction (commanded rotation direction) of the motor 18 based on the rotation command Cr is a reverse direction and the rotation direction (detected rotation direction) of the encoder 20 as detected by the encoded signals Dab and determined by the connection determination unit 40 is a reverse direction (reverse polarity) (pattern IV), or more briefly speaking, when it is determined that the rotation direction (commanded rotation direction) of the motor 18 based on the rotation command Cr and the rotation direction (detected rotation direction) of the encoder 20 are directions in the same phase (patterns I, IV).

On the other hand, when it is determined that the rotation direction (commanded rotation direction) of the motor 18 based on the rotation command Cr and the rotation direction (detected rotation direction) of the encoder 20 as detected by the encoded signals Dab and determined by the connection determination unit 40 are directions in opposite phases (pattern II, pattern III), the match/mismatch determination signal Dt indicating "Dt=mismatch" is output from the connection determination unit 40.

In this embodiment, the normal direction (normal polarity) of the rotation direction is defined as a clockwise direction (CW direction), and the reverse direction (reverse polarity) of the rotation direction is defined as a counter-clockwise direction (CCW direction).

When the rotation direction (commanded rotation direction) of the motor 18 based on the rotation command Cr mismatches the rotation direction (detected rotation direction) of the encoder 20 as detected by the encoded signals Dab, that is, when the rotation directions are opposite to each other and the match/mismatch determination signal Dt indicates "Dt=mismatch" (pattern II, pattern III), the phase rotation change unit 38 does not change the physical connection of the power lines 26 or the attachment direction of the encoder 20, and the control change unit 36 changes the phase rotation or reverses the polarity by the following first method or second method to control the motor 18 via the power conversion unit 24 through the voltage command generation unit 34.

First Method: The control change unit 36 outputs current feedback signals Fi obtained by changing the phase rotation of the current detection signals Di detected by the current sensors 16 to the current command generation unit 32, and outputs the phase rotation change command (phase rotation change command signal) Cc for changing the phase rotation of the three-phase voltage commands Cv to the voltage command generation unit 34.

Second Method: The control change unit 36 outputs the A-phase and B-phase feedback signals Fab obtained by changing the polarity (phase rotation) of the encoded signals Dab detected by the encoder 20 to the torque command generation unit 30.

Operation

Next, an automatic phase rotation correction processing operation of the control unit 22 of the motor control device 10 basically configured as described above will be described in detail with reference to flowcharts shown in FIGS. 3 and 4. It should be noted that, unless otherwise specified, it is the CPU of the control unit 22 that executes the program according to the flowchart, but since it is complicated to refer to this each time, it is referred to as necessary.

Figure 3:
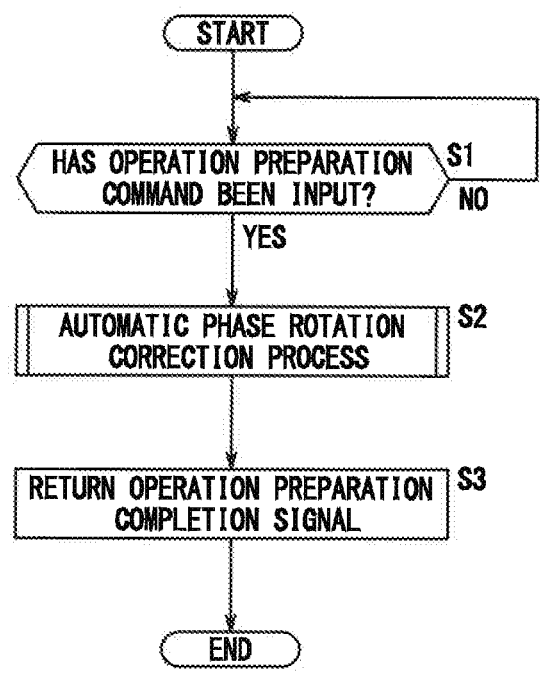
FIG. 3 is a main flowchart provided for explaining the operation of the motor control device according to the embodiment.

In step S1 of the main flowchart of FIG. 3, the control unit 22 of the motor control device 10 determines whether or not an operation preparation command has been input from a host control device (not shown).

When it is determined that the operation preparation command has been input (step S1: YES), in step S2, the control unit 22 executes an automatic phase rotation correction process.

FIG. 4 is a detailed flowchart of the automatic phase rotation correction process in step S2. In the detailed flowchart, the processes and determinations in steps S2a to S2d are executed by the connection determination unit 40 of the control unit 22, and the automatic phase rotation correction process in step S2e is executed by the phase rotation change unit 38.

FIGS. 5A to 5E are schematic diagrams illustrating the rotational position of a rotor 50 of the motor 18 with respect to the direction of a line of magnetic force 52 in xy orthogonal coordinates.

In step S2a of the detailed flowchart of FIG. 4, the connection determination unit 40 sends the current command Ci for providing a first excitation phase of 270° to the voltage command generation unit 34 through the current command generation unit 32.

As a result, the voltage command generation unit 34 generates the three-phase voltage commands Cv corresponding to the current command Ci for providing the excitation phase of 270°, and the power conversion unit 24 supplies, to the stator coil of the motor 18, the three-phase motor currents Im for stopping the rotor 50 at the 270° position. In this case, the line of magnetic force 52 is generated in the direction of 270° indicated by a thick straight arrow in FIG. 5A, and the rotor 50 rotationally moves from the direction of 0° to the direction of 270°.

Figure 5A:
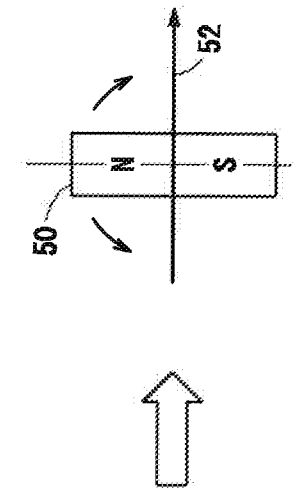
FIGS. 5A, 5B, 5C, 5D and 5E are each a diagram schematically illustrating a rotational position of a rotor of a motor with respect to a direction of a line of magnetic force in xy orthogonal coordinates.
Figure 5B:
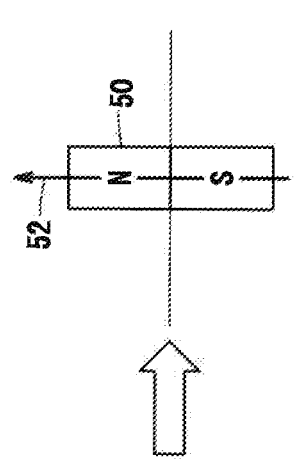
Figure 5C:
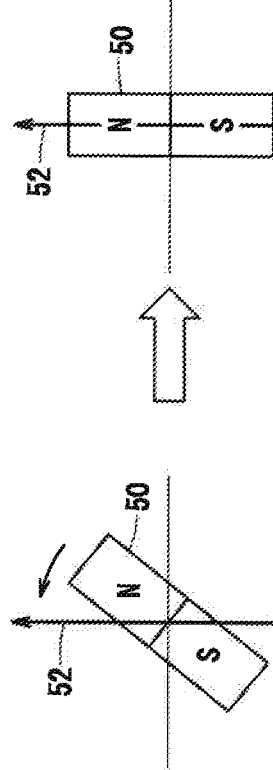

Next, in step S2b, the connection determination unit 40 confirms the encoded signals Dab sent from the encoder 20, and waits until the rotor 50 stops (step S2b: YES). FIG. 5B shows a state in which the rotor 50 stops at an excitation phase of 270°.

Next, in step S2c, the connection determination unit 40 sends, to the voltage command generation unit 34, the current command Ci for providing a second excitation phase of 0° different from the first excitation phase of 270°.

As a result, the voltage command generation unit 34 generates the three-phase voltage commands Cv corresponding to the current command Ci for providing the excitation phase of 0°, and the power conversion unit 24 supplies, to the stator coil of the motor 18, the three-phase motor currents Im for stopping the rotor 50 at the 0° position. In this case, the line of magnetic force 52 is generated in the direction of 0° indicated by an arrow in FIG. 5C, and the rotor 50 rotates in either the normal direction (CW) or reverse direction (CCW) from the 270° position.

Next, in step S2d, the connection determination unit 40 refers to the determination table 46 to confirm whether the rotation direction of the motor 18 indicated by the rotation command Cr, in other words, the rotation direction of the motor 18 based on the rotation command Cr (commanded rotation direction) matches or mismatches the rotation direction of the motor 18 indicated by the encoded signals Dab, in other words, the rotation direction of the encoder 20 based on the encoded signals Dab detected by the encoder 20 (detected rotation direction).

Figure 5E:
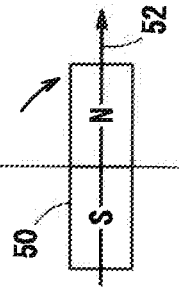
Figure 5D:
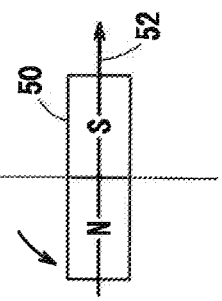

As shown in FIG. 5D, when the rotation directions do not match (the commanded rotation direction and the detected rotation direction do not match and are opposite in phase) (step S2d: NO, mismatch), it is determined that either the connection of the three-phase power lines 26 or the attachment of the encoder 20 is wrong, and the match/mismatch determination signal Dt indicating "Dt=mismatch" is sent to the phase rotation change unit 38.

In this case, in step S2e, the phase rotation change unit 38 changes the phase rotation of the current detection signals Di detected by the current sensors 16 so that the current feedback signals Fi obtained by the change (correction) are sent to the current command generation unit 32, and sends the phase rotation change command Cc for the voltage commands Cv to the voltage command generation unit 34 to change the phase rotation of the three-phase voltage commands Cv generated by the voltage command generation unit 34.

Then, the processes in steps S2a to S2d are executed again, and when the determination in step S2d is affirmative (step S2d: YES, match), the automatic phase rotation correction process in step S2 is ended, and the process proceeds to step S3 (FIG. 3). In the determination process of step S2d initially performed, when the match/mismatch determination signal Dt indicates "Dt=match" (step S2d: YES) as shown in FIG. 5E, the process proceeds to step S3 without the process by the phase rotation change unit 38 being performed.

In Step S3, the control unit 22 returns an operation preparation completion signal corresponding to the operation preparation command input in Step S1, to the host control device.

Subsequently, the motor control device 10 controls the motor 18 based on the determination result of the control change unit 36.

The above-described command is a command for 90° rotation in the normal direction (CW) caused by the first excitation phase of 270° and the second excitation phase of 0°, but the excitation phases are not limited to this combination, and may be any combination by which the rotation command direction and the actual rotational movement direction can be distinguished. For example, the combination may be such that the first excitation phase is 315° and the second excitation phase is 0°.

Further, when the rotation directions do not match with each other in the rotation direction confirmation process in step S2d, then in the process in step S2e described above, the phase rotation change unit 38 changes the phase rotation of the current detection signals Di so that the current feedback signals Fi obtained by the change are sent to the current command generation unit 32, and sends the phase rotation change command Cc for the voltage commands Cv to the voltage command generation unit 34 to change the phase rotation of the three-phase voltage commands Cv generated by the voltage command generation unit 34 (the first method described above), but the present invention is not limited to this feature.

Specifically, without performing these changing processes (first method: the process of changing the phase rotation of the current detection signals Di and the process of changing the phase rotation of the voltage commands Cv), the phase rotation change unit 38 may perform polarity change so that the polarity of the A-phase and B-phase feedback signals Fab sent from the control change unit 36 to the torque command generation unit 30 is opposite to the polarity of the detected encoded signals Dab (second method: the process of changing the polarity of the encoded signals Dab).

Figure 6:
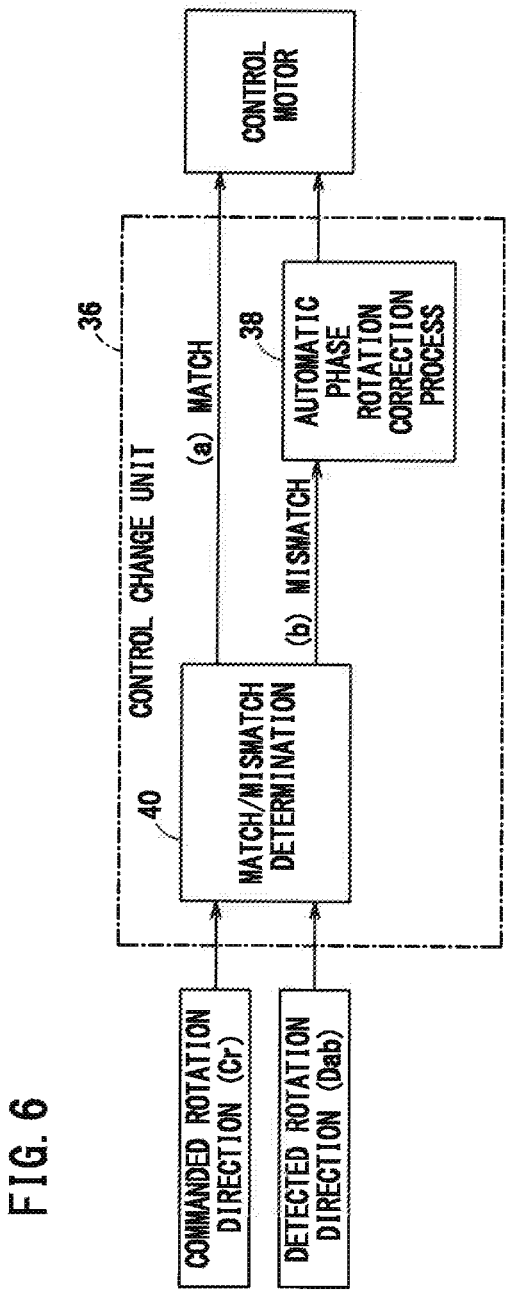
FIG. 6 is an explanatory block diagram for explaining the effects of a control change unit of the motor control device according to the embodiment.

FIG. 6 is an explanatory block diagram for explaining the effects of the control change unit 36 of the motor control device 10 according to the present embodiment.

As shown in FIG. 6, concerning the determination as to whether the rotation direction of the motor 18 based on the rotation command Cr (commanded rotation direction (Cr)) matches or mismatches the rotation direction of the encoder 20 based on the encoded signals Dab detected by the encoder 20 (detected rotation direction (Dab)), (a) when the match/mismatch determination result of the connection determination unit 40 indicates "mismatch" (patterns I, IV), the control change unit 36 deems the phase rotation (connection) of the power lines 26 and the attachment direction of the encoder 20 to be correct, and the motor 18 is controlled by the motor control device 10 without performing the phase rotation correction process (step S2e) by the phase rotation change unit 38.

It should be noted that the mode, in which the motor 18 is controlled with the phase rotation of the power lines 26 and the attachment direction of the encoder 20 being deemed to be correct, includes a case in which the phase rotation (connection) of the power lines 26 is "reverse" and the attachment direction of the encoder 20 is wrong (the attachment direction is reversed).

(b) When the match/mismatch determination result of the connection determination unit 40 indicates "mismatch" (patterns II and III), it is determined that the phase rotation (connection) of the power lines 26 or the attachment direction of the encoder 20 is wrong, the automatic phase rotation correction process (step S2e) is performed by the phase rotation change unit 38, and the motor 18 is controlled by the motor control device 10.

According to the motor control device 10 of the embodiment, by controlling the motor 18 as in (a) and (b) described above, the rotation direction detected by the encoder 20, that is, the rotation direction of the motor 18 can be matched with the rotation command Cr without changing the physical connection of the power lines 26 and the physical connection (attachment direction) of the encoder 20.

Modification

The above embodiment can be modified as follows.

FIG. 7 is a schematic configuration diagram of a motor control device 10A according to a modification. In FIG. 7, the same components as those of the above-described embodiment are denoted by the same reference numerals, and only different portions will be described.

The motor control device 10A according to this modification includes a display unit 56 and includes, in a control unit 22A of the motor control device 10A, a determination result storage unit 54 (non-volatile rewritable memory) that stores the match/mismatch determination result as to whether the rotation direction of the rotor 50 based on the rotation command Cr matches or mismatches the rotation direction detected by the encoded signals Dab, in association with any of the patterns I, II, III, and IV.

In the motor control device 10A according to this modification, first, when the motor control device 10A is restarted, the control change unit 36 uses the determination result (any of the patterns I, II, III, and IV) stored in the determination result storage unit 54, whereby the power conversion unit 24 can be controlled.

Second, the control unit 22A can display, on the display unit 56, the determination result (the determination table 46 shown in FIG. 2 and the corresponding pattern) stored in the determination result storage unit 54.

Invention that can be Grasped from Embodiment and Modification

The invention that can be grasped from the above embodiment and modification will be described below. For convenience of understanding, the reference numerals used in the above-described embodiment and modification are given to the constituent elements, but the constituent elements are not limited to those denoted by the reference numerals.

The motor control device 10, 10A according to the present invention includes: the control unit 22, 22A configured to control the motor 18 on the basis of the voltage commands Cv that are based on the rotation command Cr; the rotation direction detection unit 20 configured to detect the normal or reverse polarity of the rotation direction of the motor 18; and the current detection units 16 configured to detect the currents Im flowing through the power lines 26 of the motor 18, wherein the control unit 22, 22A includes the connection determination unit 40 for the power lines 26, and the phase rotation change unit 38, the connection determination unit 40 for the power lines 26 determines whether the rotation direction of the motor 18 based on the rotation command Cr and the rotation direction detected by the rotation direction detection unit 20 match or mismatch each other, and when the rotation directions are determined to mismatch each other by the connection determination unit 40, the phase rotation change unit 38 changes the phase rotation of the detected current values (current detection signals Di) and the phase rotation of the voltage commands Cv, or reverses the polarity detected by the rotation direction detection unit 20, thereby controlling the motor 18.

According to this configuration, even if the phase rotation of the power lines 26 physically connected between the power conversion unit 24 and the motor 18 or the attachment direction of the rotation direction detection unit 20 is wrong, the phase rotation change unit 38 changes the phase rotation of the current detection signals Di detected by the current detection units 16 and the phase rotation of the voltage commands Cv or reverses the polarity detected by the rotation direction detection unit 20 to control the motor 18, whereby the rotation direction of the motor 18 can be matched with the rotation direction based on the rotation command Cr without changing the physical connection of the power lines 26.

In this case, when the voltage commands Cv for providing the preset first excitation phase of 270° are output from the control unit 22, 22A to stop the rotor 50, and the voltage commands Cv for providing the preset second excitation phase of 0° different from the first excitation phase of 270° are further output from the control unit 22, 22A, the connection determination unit 40 for the power lines 26 may determine whether the rotation directions match or mismatch each other.

In this manner, by determining whether the rotation directions of the motor 18 match or mismatch each other according to the match/mismatch of the rotation directions associated with the rotation of the motor 18 when the three-phase voltage commands Cv for providing the first excitation phase of 270° are output from the control unit 22, 22A to stop the motor 18, and the voltage commands Cv for providing the second excitation phase of 0° different from the first excitation phase of 270° are further output from the control unit 22, 22A, it is possible to determine whether the connection of the power lines 26 is correct or not in association with whether the polarity detected by the rotation direction detection unit 20 is the normal polarity or reverse polarity.

Further, the determination result storage unit 54 configured to store the determination result of the connection determination unit 40 may be provided, and the control unit 22A may control the motor 18 based on the determination result stored in the determination result storage unit 54.

According to this configuration, when the motor control device 10A is restarted, it is possible to quickly and accurately control the motor 18 by the motor control device 10A without repeatedly performing the rotation direction confirmation processes (steps S2*a* to S2*d*) by the connection determination unit 40.

Further, the display unit 56 may be provided, and the control unit 22A may cause at least the determination result to be displayed on the display unit 56.

According to this configuration, an operator can grasp the presence or absence of the operation of the phase rotation change unit 38 by the display such as the change of the phase rotation by the value of the bit or the character string on the display unit 56.

The present invention is not limited to the above-described embodiment, and it goes without saying that various configurations can be adopted therein based on the disclosure of the specification.

The invention claimed is:

1. A motor control device comprising:
    a control unit configured to control a motor on a basis of voltage commands that are based on a rotation command;
    a rotation direction detection unit configured to detect a normal or reverse polarity of a rotation direction of the motor; and
    a current detection unit configured to detect a current flowing through each of power lines of the motor, wherein
    the control unit includes a connection determination unit for the power lines, and a phase rotation change unit,
    the connection determination unit for the power lines determines whether the rotation direction of the motor that is based on the rotation command and the rotation direction detected by the rotation direction detection unit match or mismatch each other, and
    when the rotation directions are determined to mismatch each other by the connection determination unit, the phase rotation change unit changes a phase rotation of detected current values and a phase rotation of the voltage commands, or reverses a polarity detected by the rotation direction detection unit, thereby controlling the motor.

2. The motor control device according to claim 1, wherein when the voltage commands for providing a first excitation phase are output from the control unit, and the voltage commands for providing a second excitation phase different from the first excitation phase are further output from the control unit, the connection determination unit for the power lines determines whether the rotation directions match or mismatch each other.

3. The motor control device according to claim 1, further comprising a determination result storage unit configured to store a determination result of the connection determination unit, wherein
    the control unit controls the motor on a basis of the determination result stored in the determination result storage unit.

4. The motor control device according to claim 3, further comprising a display unit, wherein
    the control unit causes at least the determination result to be displayed on the display unit.

* * * * *